(12) United States Patent
Waters et al.

(10) Patent No.: US 12,086,013 B2
(45) Date of Patent: Sep. 10, 2024

(54) USB INTERFACE CIRCUIT AND METHOD FOR LOW POWER OPERATION

(71) Applicant: Texas Instruments Incorporated, Dallas, TX (US)

(72) Inventors: Deric Wayne Waters, Dallas, TX (US); Gregory Wallis Collins, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/505,522

(22) Filed: Oct. 19, 2021

(65) Prior Publication Data

US 2022/0035436 A1    Feb. 3, 2022

Related U.S. Application Data

(63) Continuation of application No. 15/346,865, filed on Nov. 9, 2016, now Pat. No. 11,181,966.

(Continued)

(51) Int. Cl.
*G06F 1/3287* (2019.01)
*G06F 1/26* (2006.01)
(Continued)

(52) U.S. Cl.
CPC ............ *G06F 1/3287* (2013.01); *G06F 1/266* (2013.01); *G06F 13/385* (2013.01);
(Continued)

(58) Field of Classification Search
CPC ...... G06F 1/266; G06F 1/3287; G06F 13/385; G06F 13/4022; G06F 13/4282; Y02D 10/00; Y02D 30/50
See application file for complete search history.

(56) References Cited

U.S. PATENT DOCUMENTS

| 5,747,834 A | 5/1998 | Chen et al. |
|---|---|---|
| 5,780,905 A | 7/1998 | Chen et al. |

(Continued)

FOREIGN PATENT DOCUMENTS

| CN | 101021741 A | 8/2007 |
|---|---|---|
| CN | 101359316 A | 2/2009 |

(Continued)

OTHER PUBLICATIONS

Axelson, J., "USB Complete, Everything You Need to Develop Custom USB Peripherals, Third Edition," Lakeview Research LLC., 1999-2005, 4 pages.

(Continued)

*Primary Examiner* — Eric T Oberly
(74) *Attorney, Agent, or Firm* — Ray A. King; Frank D. Cimino

(57) ABSTRACT

Described examples include USB port controllers with a control circuit configured to switch from a normal first power mode to a second power mode for reduced power consumption in response a command from a port manager circuit, and to switch from the second power mode to the first power mode in response to detected activity on a communications connection, or a detected connection of a USB device to a USB port connector. After switching back to the first power mode in response to detected communications activity, the control circuit automatically switches operation of the USB port controller back to the second power mode unless a communications transaction addressed to the USB port controller is received within a non-zero certain time after switching from the second power mode to the first power mode.

19 Claims, 4 Drawing Sheets

Related U.S. Application Data

(60) Provisional application No. 62/254,952, filed on Nov. 13, 2015.

(51) Int. Cl.
*G06F 13/38* (2006.01)
*G06F 13/40* (2006.01)
*G06F 13/42* (2006.01)

(52) U.S. Cl.
CPC ...... *G06F 13/4022* (2013.01); *G06F 13/4282* (2013.01); *Y02D 10/00* (2018.01); *Y02D 30/50* (2020.08)

(56) References Cited

U.S. PATENT DOCUMENTS

| | | | |
|---|---|---|---|
| 5,850,095 | A | 12/1998 | Chen et al. |
| 5,982,217 | A | 11/1999 | Chen et al. |
| 6,016,002 | A | 1/2000 | Chen et al. |
| 6,567,921 | B1 | 5/2003 | Guziak |
| 6,946,817 | B2 | 9/2005 | Fischer et al. |
| 7,268,561 | B2 | 9/2007 | Zhu |
| 7,675,571 | B2 | 3/2010 | Cheng et al. |
| 7,895,385 | B2 | 2/2011 | Raju |
| 8,386,814 | B2 | 2/2013 | Tom et al. |
| 8,442,586 | B2 | 5/2013 | Danis et al. |
| 8,890,248 | B2 | 11/2014 | Pauletti et al. |
| 2002/0061012 | A1* | 5/2002 | Thi .................. H04M 7/006 370/352 |
| 2007/0188132 | A1 | 8/2007 | Hussain et al. |
| 2007/0192643 | A1 | 8/2007 | Li et al. |
| 2008/0029782 | A1 | 2/2008 | Carpenter et al. |
| 2008/0215765 | A1 | 9/2008 | Butler et al. |
| 2009/0216981 | A1 | 8/2009 | Diefenbaugh et al. |
| 2010/0064153 | A1 | 3/2010 | Gk et al. |
| 2010/0090644 | A1 | 4/2010 | Nokkonen et al. |
| 2011/0016334 | A1 | 1/2011 | Tom et al. |
| 2011/0016341 | A1 | 1/2011 | Tom et al. |
| 2011/0128153 | A1 | 6/2011 | Sims et al. |
| 2011/0161694 | A1 | 6/2011 | Fujiwara |
| 2011/0231682 | A1* | 9/2011 | Kakish .................. G06F 1/3215 710/72 |
| 2011/0252245 | A1 | 10/2011 | Lai |
| 2011/0298426 | A1 | 12/2011 | Hussain |
| 2012/0119696 | A1 | 5/2012 | Picard |
| 2013/0031392 | A1* | 1/2013 | McLane ............ H04W 52/0229 713/323 |
| 2013/0042130 | A1 | 2/2013 | Li |
| 2013/0054983 | A1 | 2/2013 | Zhou |
| 2013/0151825 | A1 | 6/2013 | Huynh |
| 2013/0238920 | A1 | 9/2013 | Harris |
| 2013/0254431 | A1 | 9/2013 | Kuroiwa et al. |
| 2013/0290765 | A1 | 10/2013 | Waters et al. |
| 2013/0326251 | A1* | 12/2013 | Adewale ............... G06F 1/3234 713/323 |
| 2015/0082061 | A1* | 3/2015 | Ramirez ............... G06F 1/1632 713/323 |
| 2015/0293514 | A1 | 10/2015 | Tupala |
| 2015/0304785 | A1* | 10/2015 | Gan ....................... H04R 29/00 381/56 |
| 2015/0333735 | A1* | 11/2015 | Elias ..................... H03K 3/01 327/540 |
| 2017/0070010 | A1 | 3/2017 | Zupke et al. |

FOREIGN PATENT DOCUMENTS

| | | | |
|---|---|---|---|
| CN | 101663634 | A | 3/2010 |
| CN | 102640076 | A | 8/2012 |
| CN | 102955552 | A | 3/2013 |
| EP | 2930588 | A1 | 10/2015 |
| JP | 2011134126 | A | 7/2011 |
| JP | 2013161272 | A | 8/2013 |
| JP | 2015098096 | A | 5/2015 |
| TW | 201248412 | A | 12/2012 |
| WO | WO2012155820 | A1 | 11/2012 |
| WO | 2015168385 | A1 | 11/2015 |

OTHER PUBLICATIONS

"MAX3421E USB Peripheral/Host Controller with SPI Interface," Maxim Integrated, Evaluation Kit Available, 19-3953; Rev 4, 2013, 28 pages.

"The 12C-bus and How to Use It (including specifications)," Phillips Semiconductors, Apr. 1995, 24 pages.

"USB Charging Port Controller and Power Switch with Load Detection," Texas Instruments, TPS2546, SLVABJ2A, Feb. 2013, 40 pages.

"Universal Serial Bus Type-C Cable and Connector Specification, Release 1.0," USB 3.0 Promoter Group, Aug. 11, 2014, 84 pages.

"Universal Serial Bus Type-C Cable and Connector Specification, Release 1.1," USB 3.0 Promoter Group, Apr. 3, 2015, 19 pages.

"Universal Serial Bus 3.1 Specification, Revision 1.0," Hewlett-Packard Co., et al., Jul. 26, 2013, 75 pages.

Extended European Search Report dated May 28, 2019, European Application No. 16865211.3, 2 pages.

Supplementary Partial European Search Report dated Oct. 15, 2018, 1 page.

International Search Report dated Mar. 16, 2017, PCT Application No. PCT/US2016/061862, 1 page.

China National Intellectual Property Administration ("CNIPA") issue of a first office action with a search report; mail date: Mar. 14, 2024; 2 pages.

* cited by examiner

USB INTERFACE CIRCUIT AND METHOD FOR LOW POWER OPERATION

REFERENCE TO RELATED APPLICATION

This application is a Continuation application to U.S. patent application Ser. No. 15/346,865 filed Nov. 9, 2016, entitled "USB INTERFACE CIRCUIT AND METHOD FOR LOW POWER OPERATION," which claims priority to U.S. Provisional Patent Application No. 62/254,952 filed Nov. 13, 2015, entitled "TYPE-C PORT CONTROLLER I2C IDLE MODE", which Applications hereby incorporated herein by reference in their entireties.

BACKGROUND

Universal serial bus (USB) ports and cables provide interconnection of a variety of compatible electronic devices, such as desktop computers, automobile dashboard consoles and battery-powered portable devices such as laptop computers, tablets, mobile phones, e-readers MP3 players and the like. USB ports are accessed using standardized USB cable connections to provide serial communications between devices, as well as electrical power transfer for charging and operating battery-powered peripheral devices. USB compatible systems often include interface integrated circuits (ICs) mounted to an internal circuit board to interface USB data and power connections to host system circuitry such as power circuits and host processors. Dedicated USB charging devices are also available, having multiple USB ports for charging various portable devices. USB chargers may also include circuitry for fast charging certain peripheral devices. Many desktop and laptop computers include multiple USB ports for data transfer and/or peripheral device charging. USB power delivery (USB-PD) and Type-C (USB-C) specifications describe delivery of higher power over USB cables and connectors to provide a universal power plug for devices that may accommodate more than 5 V charging power, for example, for fast or quick-charging capabilities. The USB-PD specification defines communications for negotiating voltage and current levels for power transfer from a source port to a sink port, where the power negotiation communications is independent from the normal USB communications.

Power consumption is a concern for USB port controllers in many USB port systems, such as battery-powered devices. Moreover, multi-port USB systems may include one or more unused or unattached ports along with other ports connected to a USB compatible device. The different USB ports are individually managed by an associated port controller, and a port manager circuit communicates with the port controllers using a communications interconnection, such as an I2C serial bus with data and clock lines. The USB Implementers Forum (USB-IF) released an I2C specification on Oct. 20, 2015 that defines the register set that a port manager may use to interact with a port controller. I2C is an example of a serial interface. The port manager can place an unused port controller into a low-power operating mode by sending an appropriate command. However, the port manager operates as a master and a master-slave communications architecture along the I2C bus, and each port controller must maintain serial interface circuitry in a powered condition in order to react quickly to a read or write transaction at any time. Moreover, the idle mode port controller must react to detected communications transactions, even if not addressed for that port controller, and the port manager must then send another command to place the port controller back into the idle mode. This condition is exacerbated in systems having multiple idle mode ports, where communications to an active port cause all the idle ports to respond, and the port manager must send multiple commands to again place these port controllers into the idle mode, each of which causes another idle mode interruption.

SUMMARY

Disclosed examples include USB port controllers and methods for reduced power consumption and low power or idle mode operation of USB port controllers. A port controller switches from a normal first power mode to a second power mode for reduced power consumption in response to a command from a port manager circuit. The port controller switches back from the second power mode to the first power mode in response to detected activity on a communications connection, or in response to detected connection of a USB device. Where the low power mode exit was due to detected communications activity, the port controller automatically switches back to the second power mode unless a communications transaction addressed to the USB port controller is received within a certain time. This enhances power conservation by allowing the port controller to return to low-power operating mode without waiting for a specific command from a port manager circuit, and the port manager circuit does not need to interrupt other port controllers with such messaging, thereby allowing idle mode port controllers to avoid responding to communications events.

In certain examples, the USB port controller can be configured by a port manager to operate as a source, a sink and/or as a dual role power (DRP) port controller. The port controller operates according to this configured port mode in both the normal power mode and the low power mode, and continues or resumes the configured port mode operation after exiting the low-power mode. In certain implementations, a DRP configured port controller toggles between an unattached sink state and an unattached source state during normal power mode operation. In the low power or idle mode operation, the DRP configured port controller toggles between the unattached source state and a disabled state. The port controller in certain examples includes a low-power connection or attachment detection circuit, such as a simple comparator circuit, that monitors a voltage of a configuration channel (CC) line of the USB port connector to detect connection of a power syncing USB device. In certain examples, the port controller includes a bias control circuit with a switch to selectively connect a relatively high resistance pull-down resistor to the CC line in the disabled state in the low-power mode. This allows the comparator circuit to use a higher threshold voltage for USB device attachment detection.

Further disclosed examples include methods for operating a USB port controller, including switching operation of the controller from a first (normal) power mode to a second low power mode in response to a command from a port manager circuit. Certain examples also provide for switching from the second power mode to the first power mode in response to detected activity on a communications connection or detected connection of a USB device to a USB port controller. The method further includes automatically switching back to the second power mode unless a communications transaction addressed to the USB port controller is received within a certain time after switching to the first power mode in response to detected communications activity.

DETAILED DESCRIPTION

Figure 1:
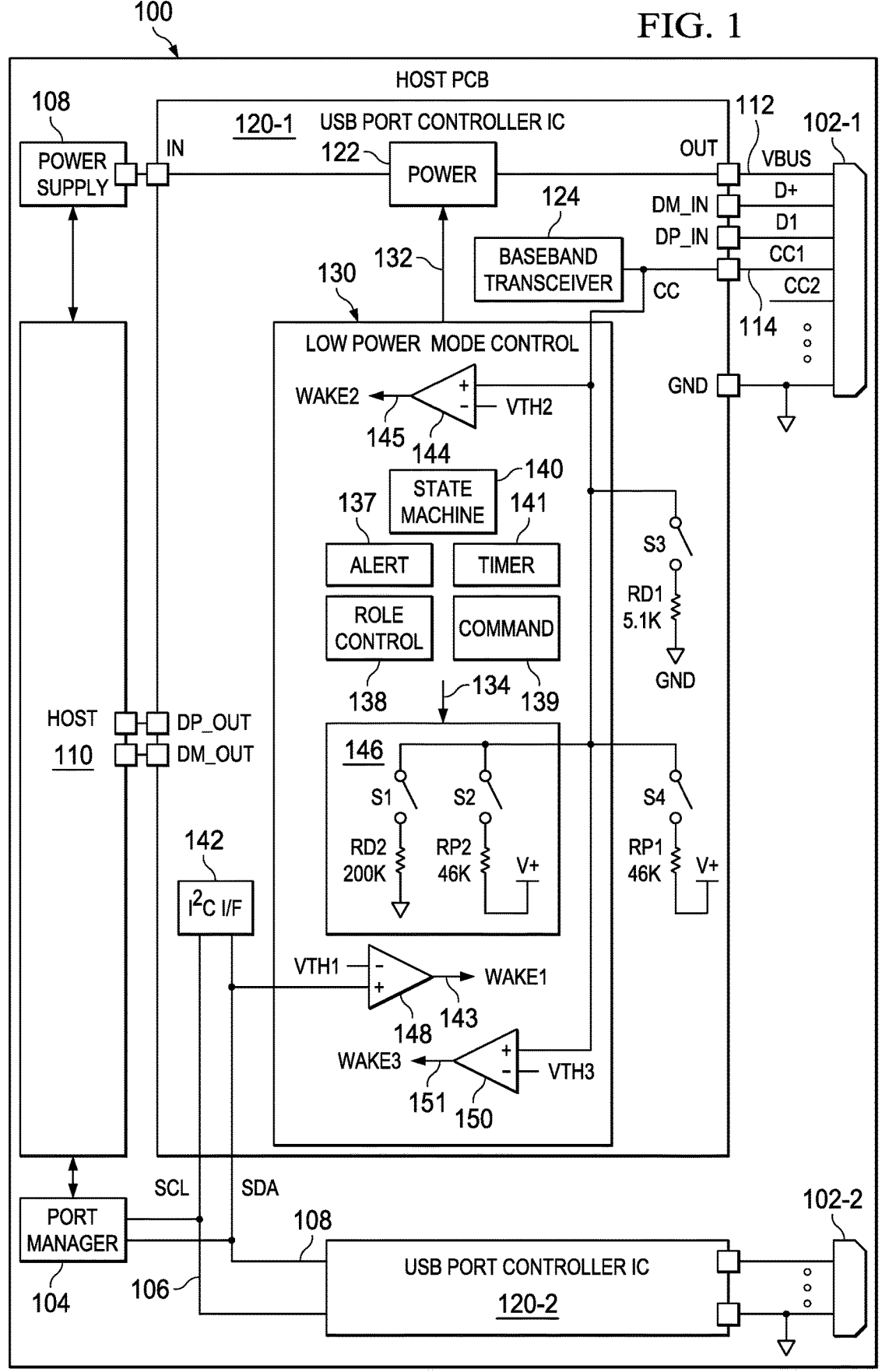
FIG. 1 is a schematic diagram of a host printed circuit board with a host processor, a port manager and multiple USB port controller ICs to interface with USB compatible devices.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows a USB host system implemented using a host printed circuit board (PCB) 100 including various circuits implementing a USB power delivery (USB-PD) system. The system includes multiple port connectors 102-1 and 102-2, along with associated port controller integrated circuits (ICs) 120-1 and 120-2. The port controllers 120 interface a host circuit, such as a processor 110 with one or more USB devices (not shown) for data and/or power transfer through the connectors 102. The first USB port controller IC 120-1 is described below, and similar components and operation are provided for the second illustrated USB port controller 120-2. The host system 100 controls power transfer between the host PCB 100 and a connected USB compatible device using the port controller 120. The connector 102 in one example is a Type C (USB-C) port connector 102 associated with a corresponding USB port. The USB controller 120 in one example includes a terminal to electrically couple a baseband transceiver 124 with a configuration channel line 114 of the USB cable connector 102. The baseband transceiver 124 includes an I/O connection to transmit data to the CC line 114 according to a transmit data signal from the host processor 110, and to receive data from the configuration channel line 114. The host processor 110 and the controller IC 120 are powered by a power supply 108 that provides a positive voltage to a first voltage node IN of the controller 120. The controller IC 120 also includes a power circuit 122 connected to a bus voltage line 112 (VBUS) of the USB connector 102 via an output terminal OUT of the IC 120.

In one example, the host processor 110 is a programmable or programmed processor operable when powered to execute instructions stored in an associated electronic memory (not shown) to negotiate USB power delivery parameters with the associated USB compatible devices connected to corresponding port connectors 102 via USB cables (not shown). In other examples, the host 110 can be any suitable processor, logic circuit, or combination thereof, whether implemented as a single circuit (e.g., integrated circuit or IC) or as multiple circuits. In one example, the host PCB 100 provides DP_OUT and DM_OUT connections from the controller IC 120 to the host processor 110 and the USB controller 120 provides DM_IN and DP_IN terminals to connect to D+ and D− lines of the connector 102 that allow the host processor 110 to send and receive data packets. The controller IC 120 also provides a ground terminal GND for connection to a ground line of the USB cable 102. In certain examples, no host processor 110 is provided, the port interface does not use the D+ and D− lines of the connector 102, and the DM_IN and DP_IN terminals are unused or can be omitted. In certain examples, the port controller 120 implements communications with a connected USB device along one or more configuration channel lines 114 to exchange data with a port manager circuit 104.

The port controllers 120 each include a communications interface circuit 142 to communicate with a port manager circuit 104 over a communications connection in normal mode. In one example, the port manager 104 communicates with the host processor 110, and directs or controls operation of the connected USB port controllers 120 for messaging exchange along the communications connection. In another implementation, the port manager circuit 104 is included in the host circuit 110. In yet another implementation, the port manager circuit 104 and the port controller circuit are in the same IC. In yet another implementation, multiple port controllers are in the same IC. In the illustrated example, an I2C serial bus connection is provided, including a serial clock line 106 (SCL) and a serial data line (SDA). The port controller 120 in this example provides an I2C interface circuit 142, which is selectively powered down during low power mode operation. The port manager circuit 104 in one example operates as a communication master, and the port controller ICs 120 each operate as slaves in a master-slave communications configuration using the I2C bus lines 106 and 108 to communicate with one another. In particular, the port manager 104 can provide message packets to the bus. The connected port controllers 120 are each assigned a unique address, and each port controller 120 evaluates an address field of a received message packet to determine it is the intended recipient. Using this configuration, the port manager 104 in certain examples can write data to, and read data from, registers 137-139 of each individual port controller IC 120 in order to exchange data to control certain operations of the port controllers 120.

The port controller 120 also includes a low power mode control circuit 130 with a communications interface circuit 142. The control circuit 142 can be any suitable logic circuit, whether programmable or otherwise, to implement advanced power mode and port mode operation of the port controller 120 as detailed further herein. The control circuit 130 in one example includes a state machine 140, which can be implemented by execution of firmware or program instructions, or by dedicated logic circuitry in various examples. The control circuit 130 also includes a timer circuit 141, as well as an alert register 137 (ALERT), a role control register 138 (ROLE CONTROL), and a command register 139 (COMMAND), which are used as an interface with the port manager circuit 104.

The control circuit 130 controls power modes of the port controller 120. In one example, low power control circuit 130 controls the power circuit 122 to selectively implement a first power mode (NORMAL mode) for normal operation of the USB port controller 120 or a second power mode (LP mode) for reduced power consumption by the USB port controller 120. In one example, all or some of the illustrated the low power mode control circuit 130 components remain powered during operation in the second power mode, and some or all of the remaining circuitry of the port controller 120 is powered down in the second power mode. In one implementation, the low-power mode control circuitry 130 includes two segments, one including switching circuitry to operate switches S1 and S2 and a comparator circuit 150, and only these circuits are powered up in the low-power mode. At the beginning of the normal mode operation, the I2C interface circuit 142 and the registers 137-139 and 141 become active. In this example, low power consumption is facilitated and only the circuits used to monitor the connection of a USB device (e.g., the pull up/down and comparator) are active. In one example, the power circuit 122 includes power conversion circuitry to provide power to various circuits within the port controller IC 120 under control of the power mode control circuit 130. The port manager circuit 104 can direct the control circuit 130 to cause the port controller 120 to enter the low power mode by writing the command register 139. In certain implementations, the port manager circuit 104 can also instruct the control circuit 130 to switch from the low-power mode to a normal power mode, although not a strict requirement of all implementations of the presently disclosed examples. The control circuit 130 is operatively coupled with the power circuit 122 by a connection 132, for example, to control selective shutdown or idling of certain circuits within the port controller 120 to implement a low power idle mode.

The control circuit 130 also controls "port modes" of the port controller 120. In certain examples, the port modes are directed by the port manager circuit 104 using write operations to the role control register 138 of the control circuit 130. The control circuit 130 provides control signals or command messaging via a connection 132 to allow the port manager circuit 104 to configure the power circuit 122 to selectively operate in a configured port mode. The configured port modes in one example include a first port mode (SOURCE port mode) in which the power circuit 122 delivers power to the power line 112 of the USB port connector 102. In a second port mode (SINK port mode), the power circuit 122 receives power from the power line 112. In a third port mode (DUAL ROLE POWER or DRP mode), the power circuit 122 refrains from delivering power to, or receiving power from, the power line 112 pending connection of a USB device to the connector 102.

The port manager circuit 104 writes appropriate bits to the control circuit role control register 138 via the I2C interface circuit 142 to selectively control the interface of the associated USB port to implement a variety of different configurations. The USB-PD standards define four kinds of USB compatible devices, including provider-only, provider-consumer, consumer-provider, and consumer-only. Devices that are provider-only, provider-consumer, or consumer-providers may sometimes be in a source role to provide DC voltage on the VBUS line 112 for the far-end device to consume or sink. USB-C recognizes three kinds of USB devices: downward facing port (DFP), upward facing port (UFP), and dual-role port or dual-role power (DRP). In the absence of USB-PD messaging, the DFP is the source of power and the UFP is sinking the power. USB-C cables and connectors include the configuration channel (CC) line 114 or multiple configuration channel lines for power configuration as well as for baseband communications. USB-PD specifications provide baseband communications using Biphase Mark Coding (BMC) for message exchange over the configuration channel line 114. USB-C systems use a Type-C plug with two configuration channel lines CC1 and CC2. Various aspects of the present disclosure are described in connection with a single configuration channel line 114, and these concepts can be applied with respect to multiple configuration channel lines in various implementations. The USB-PD specification defines a half-duplex packet-based communication link between ports connected via a USB-PD cable and connectors to exchange information that enables the two ports to communicate and negotiate the voltage and current provided from a source port to a sink port. The ports can negotiate to switch roles (source to sink and vice versa). The BMC communications on the CC lines is independent from the normal USB communications that go through D+ and D− lines of the USB cable. The configuration channel line or lines can be used for negotiating power transfer configurations of connected devices by way of analog signal levels. For example, up to 15 W of power can be delivered for USB Type-C cables without USB-PD messaging by controlling the DC voltage on the configuration channel line 114. The nominal voltage of the configuration channel line 114 is determined by pull up current from the DFP device (e.g., using a pull up resistor RP or a current source) and a pull down resistor RD (or pull down current source) from the UFP device. The CC line voltage value can thus vary from 0.3 V to 2.4 V in many instances due to combinations of the pull up and pull down levels.

Figure 2:
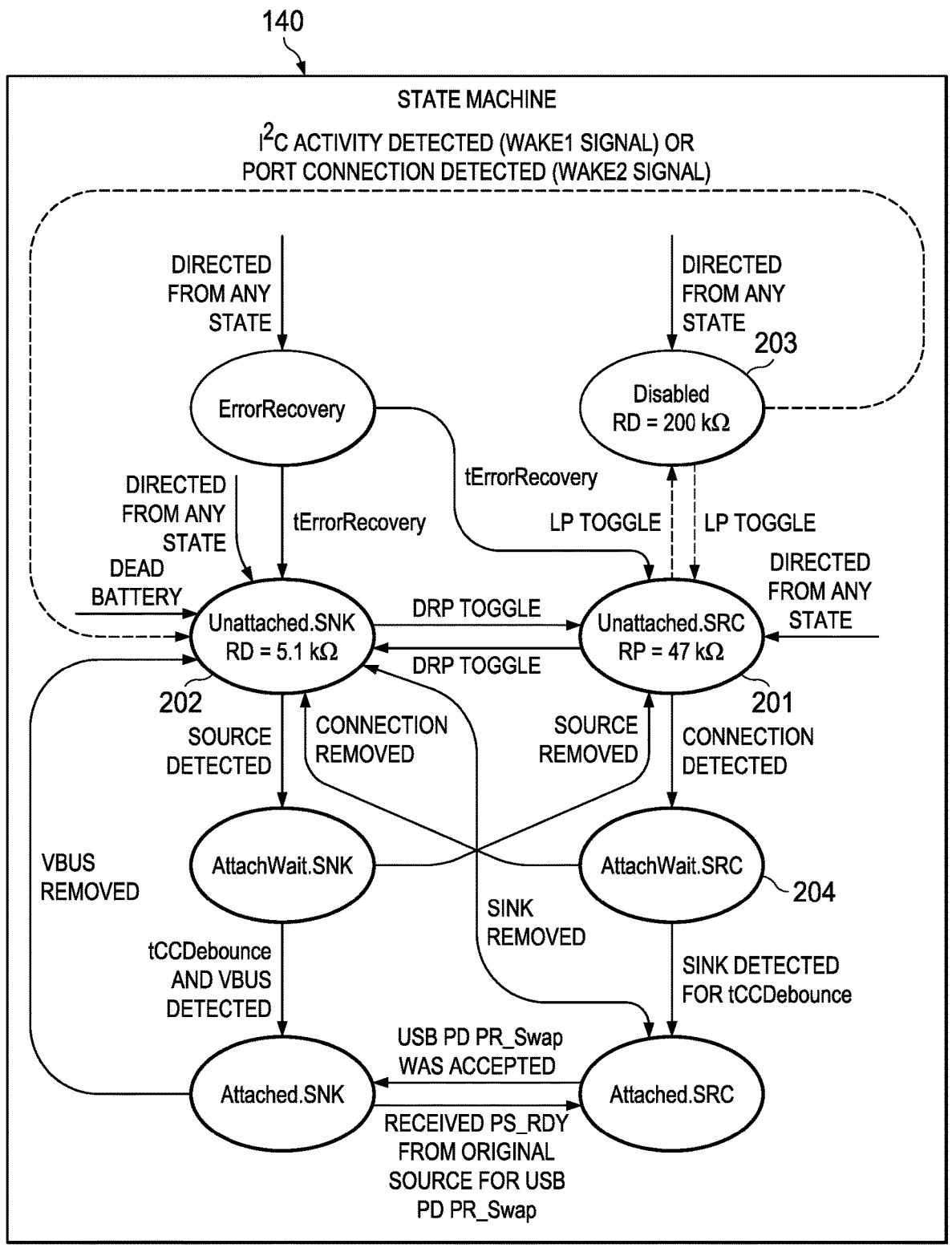
FIG. 2 is a schematic diagram of a state machine implemented in the port controllers of FIG. 1.

FIG. 2 shows further details of the example state machine 140 implemented by the control circuit 130. The control circuit 130 detects an exit of the low-power mode due to noise on the communication lines 106 or 108 or other false triggering alarm, and puts the port controller 120 back into the low-power mode without further action by the port manager 104. In the DRP port mode during the first (NORMAL) power mode, the state machine 140 toggles between an unattached.SRC state 201 and an unattached.SNK state 202. In the unattached.SRC state 201, the USB port controller 120 connects a pull-up resistor RP1 to a configuration channel line 114 of the USB port connector 102 by closing a switch S4 in FIG. 1 and normal mode comparator circuitry (not shown) monitors a voltage of the configuration channel line 114 to detect connection of a power sinking USB device to the USB port connector 102. In the unattached.SNK state 202, the USB port controller 120 closes a switch S3 to connect a relatively low resistance pull-down resistor RD1 to the configuration channel line 114 and the normal mode comparator circuitry monitors the communication channel line 114 to detect connection of a power sourcing USB device to the USB port connector 102 indicated by the configuration channel line voltage transitioning above a threshold. The switches S3 and S4 are single pole double throw such that only one is closed at time. In one example, the normal mode circuitry is capable of detecting configuration channel voltages as low as 0.25 V.

In the DRP port mode during low power mode operation of the port controller 120, the state machine 140 toggles between the unattached.SRC state 201 in which the USB port controller 120 applies a different pull-up resistor RP2 (or current source) and monitors the configuration channel line 114 and a Disabled state 203 in which the USB port controller 120 applies a different pull-down resistor RD2 and monitors the configuration channel line 114 to detect connection of a power sourcing USB device to the USB port connector 102. The low power control circuit 130 in one example includes a switching circuit 146 with a first switch S1 closed during the Disabled state 203 to connect RD2 to the configuration channel line 114. In this configuration, a first low-power comparator circuit 144 compares the voltage CC of the configuration channel line 114 with a threshold voltage of VTH2 and provides a signal WAKE2 at a comparator output 145 indicating that the CC voltage has exceeded the threshold VTH2 indicating connection of a USB device to the port 102-1.

The low-power circuitry 130 in one example also includes a switch S2 that is selectively closed during the low power mode operation in the unattached.SRC state 201. Closing the switch S2 connects a second pull-up resistor RP2 between a supply voltage V+ and the configuration channel line 114, as well as a further low power comparator 150 that compares the CC line voltage to a third threshold voltage VTH3. In this operating condition, the comparator 150 provide a signal WAKE3 at an output 151 to indicate that the CC voltage has fallen below the threshold voltage VTH3 indicating connection of a device port 102-1. Moreover, the port controller 120 continues to operate in the configured port mode (e.g., SOURCE, SINK or DRP) after switching from the second power mode to the first power mode. In this manner, the port controllers 120 reduce power consumption of the host system 100 and allow idled port controllers 120 to quickly return to low power mode when a false triggering event occurs on the communications bus 106, 108 or on the configuration channel line 114. If a power sinking USB device is attached to the port connector 102 while the port controller state machine 140 is in the unattached.SRC state 201, the state machine 140 moves to an AttachWait.SRC state 204 and then continues to implement the state-machine 140. While in the Disabled state 203, the invented state-machine 140 transitions to the unattached.SNK state 202 if the voltage on the control channel line 114 rises above the detection threshold set by VTH2. When alternately closing S1 and S2 to switch between connecting RP and RD to the CC line 114, the voltage on the configuration channel line 114 will change from high to low or low to high, and the comparator circuits will ignore this expected transition so that neither the WAKE2 or WAKE3 signals cause the port controller 120 to exit the low power operating mode during the transition.

In one example, the low power mode control circuit 130 switches operation of the port controller 120 from the first power mode for normal operation of the port controller 120, to a second power mode for reduced power consumption by the port controller 120 in response to the communications interface circuit 142 receiving a command (e.g., an I2CIdle command) from the port manager circuit 104. The control circuit 130 switches operation of the USB port controller 120 from the second power mode back to the first power mode in response to detected activity on the communications connection 106, 108, or a detected connection of a USB device to the USB port connector 102. In addition, if the low power mode exit was caused by detected communications connection activity, the control circuit 130 starts a timer 141 and automatically switches operation of the port controller 120 back to the second power mode if no communications transaction addressed to the USB port controller 120 is received within a non-zero certain time after switching from the second power mode to the first power mode (e.g., when the timer 141 expires). In this manner, if the port manager circuit 104 does not drive either a read or write transaction before the timer 141 expires, the port controller 120 returns to the low-power mode. This allows the circuit 120 to quickly return to low power operation, including situations in which the low power mode exit was caused by noise on the communications lines 106 or 108, and the port manager 104 is not trying to communicate with the port controller(s) 120. If an actual communications transaction was attempted by the port manager 104, the low-power I2C mode port controller 120 detects a rising and/or falling edge on the clock line 106 and/or the data line 108 and resumes normal power mode operation within 5 ms to be able to process another read or write from the port manager circuit 104.

The example port controller IC 120 of FIG. 1 also provides reduced power for monitoring the configuration channel line 114 during low power mode operation using dedicated low power detection circuits to detect communications or attachment events for which the controller 130 exits the second power mode. In one example, the low-power circuitry 130 includes one or more edge detector circuits that operate in the second (low) power mode to identify rising edges in voltages of the lines 106 (clock) and 108 (data). In the example of FIG. 1, the low-power circuitry 130 includes a comparator 148 the compares a voltage of the serial clock line SCL with a threshold voltage VTH1 to detect the rising or falling edge is of the serial clock line. The comparator circuit 148 includes an output 143 operative in the second power mode LP to provide a communication detection signal WAKE1 in response to a detected signal edge of the communications connection 106, 108. In response to the communication detection signal WAKE1 indicating the detected signal edge of the communications connection 106, 108, the control circuit 130 switches operation of the port controller 120 from the second power mode to the first power mode.

The port controller 120 also includes dedicated low power attachment or connection detection circuitry that remains powered in the second power mode. The comparator 144 compares the voltage CC of the configuration channel line 114 to the reference voltage VTH2 in order to detect connection of a USB device to the USB port connector 102. The comparator output 145 provides a port connection detection signal WAKE2 in response to the voltage CC of the configuration channel line 114 exceeding the threshold voltage VTH2. The port controller 120 also includes a bias control circuit 146 with switching circuitry controlled by one or more control signals on a control connection 134 to selectively pull up or pull down (e.g., bias) the voltage CC on the configuration channel line 114. In one example, the bias circuit 146 implements a single pole, double throw switch shown as switches S1 and S2 in FIG. 1 for the low power operating mode. The normal mode circuitry of the port controller 120 closes the switch S3 in the unattached-.SNK state 202 of FIG. 2 during normal power mode operation to connect a 5.1 KΩ resistor RD1 between the configuration channel line 114 and a circuit ground reference GND. A connecting USB source device with provide a current to the configuration channel line 114, causing the CC line voltage to be approximately 0.4 V.

In the low power mode, the control circuit 130 closes the switch S1 to connect a much larger resistor RD2 (e.g., 125 KΩ or more, such as 200 KΩ) between the configuration channel line 114 and GND. The pull-down resistor RD2 has a resistance higher than a pull-down resistance applied in the first power mode. This larger pull-down resistance RD2 is applied in certain examples when the port controller 120 operates in the SINK port mode or while in the Disabled state 203 during DRP port mode operation in the second power mode. The resistor RD2 preferably has a resistance value large enough so that the configuration channel line 114 appears open to a connected USB source that is applying a pull-up resistor Rp at the other end of a USB cable. In certain examples, the pull-down resistor RD2 has a resistance value large enough so that it is not detected by the sourcing USB device connected on the other end of the cable, and by which the CC line voltage remains above a voltage vOpen. The voltage vOpen depends upon the strength of the pull-up Rp, but can be 1.6V or 2.6V in certain examples. In addition, the larger resistance of RD2 increases the configuration channel line voltage CC when a power sourcing USB device connects to the port connector 102. This facilitates use of a low cost simple comparator 144 with a threshold comparison voltage VTH significantly higher than 0.25 volts during the low power mode, to allow accurate detection of actual device connection while reducing the likelihood of false detections caused by noise on the configuration channel line 114. The control circuit 130 is configured to switch the port controller 120 from the second power mode to the first power mode in response to the port connection detection signal WAKE2 from the comparator 144 indicating the voltage CC of the configuration channel line 114 exceeding the threshold voltage VTH2 in response to connection of a USB device to the USB port connector 102.

Figure 3A:
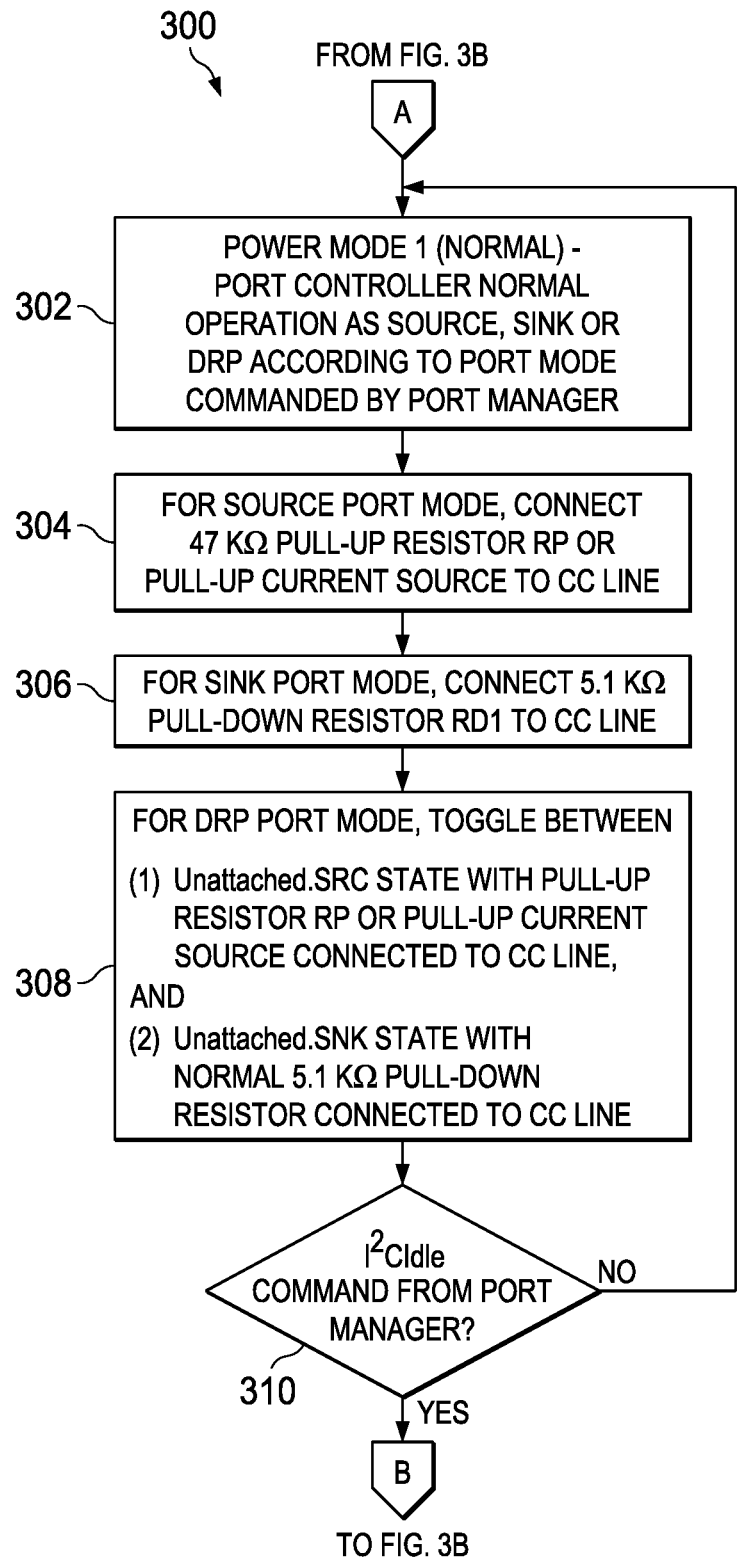
FIGS. 3A and 3B depict a flow diagram of a method for operating a USB port controller.
Figure 3B:
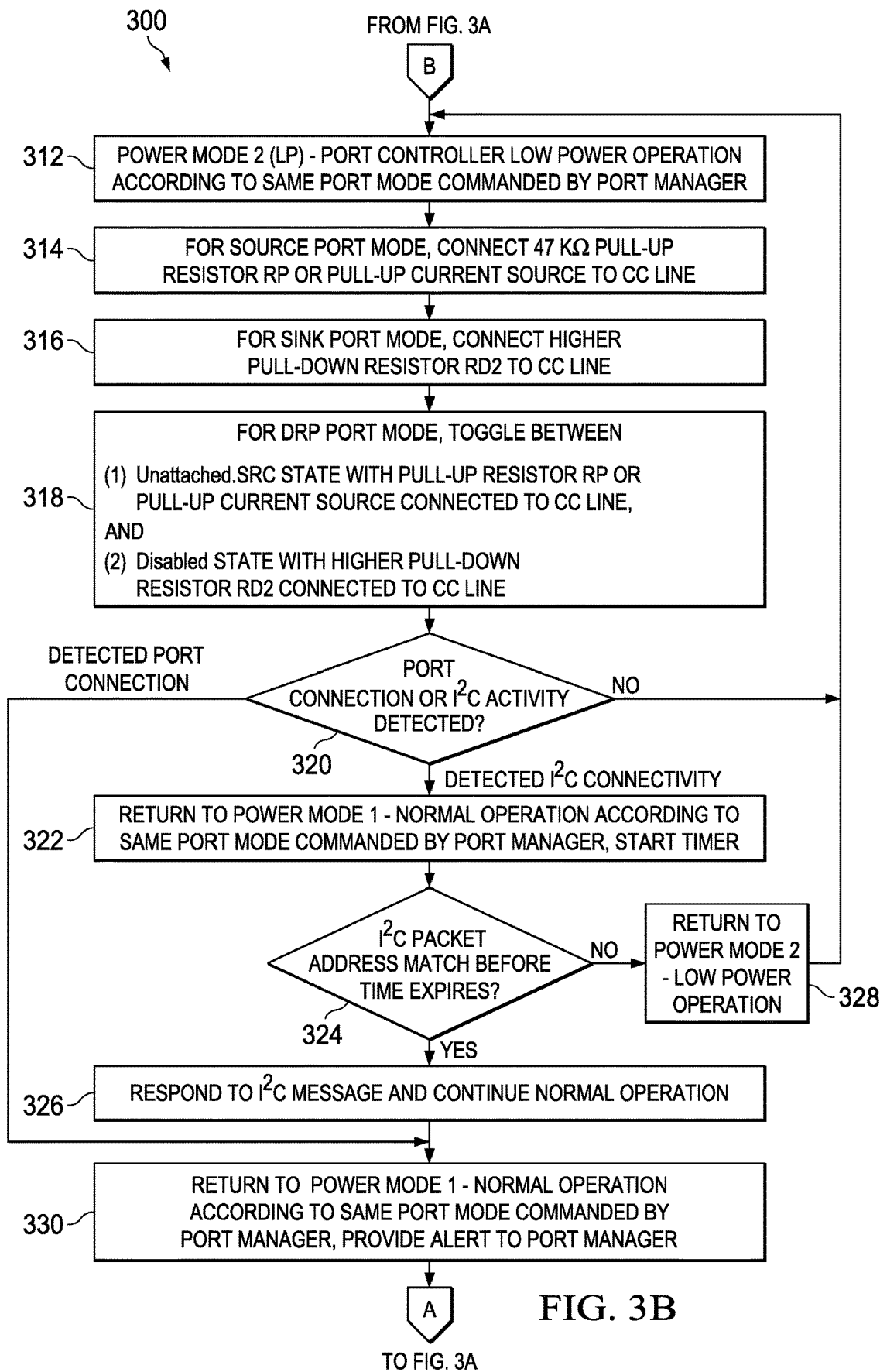

FIGS. 3A and 3B illustrate a method 300 to operate a USB port controller, which can be implemented in the above described port controllers 120. The method 300 begins at 302 in the first (NORMAL) power mode in FIG. 3A. At 302, the port controller 302 operates in a configured source, sink or DRP port mode according to a port mode commanded by the port manager 104. At 304, for a configured source port mode, a pull-up resistor RP is connected to the configuration channel line 114 (e.g., by the control circuit 130 closing the third switch S3 in FIG. 1) or by connecting a current source (not shown) to the line 114. For a configured sink port mode at 306, the port controller 120 connects the 5.1 KΩ pull down resistor (RD1 in FIG. 1) to the configuration channel line 114. At 308, for a configured dual role power port mode, the port controller 120 toggles between the unattached.SRC state 201 and the unattached.SNK state 202 in FIG. 2. The control circuit 130 determines at 310 whether an I2CIdle command has been received from the port manager circuit 104. If not (NO at 310), the method 300 continues the normal power mode operation as described above at 302-308.

If an I2CIdle command has been received from the port manager circuit 104 (YES at 310 in FIG. 3A), the method 300 continues in FIG. 3B, including switching operation to a second power mode at 312 for reduced power consumption by the port controller 120. In the second power mode, the port controller 120 implements low power operation at 314, 316 or 318 according to the previously configured port mode set by the port manager circuit 104. At 314, for the source port mode, the power circuit 122 delivers power to the power line 112 and the bias circuit 146 connects the 47 KΩ pull-up resistor RP1 (or a current source, not shown) to the configuration channel line 114 via the switch S4. For the sink port mode at 316, the power circuit 122 receives power from the power line 112 and the bias circuit 146 connects a 200 KΩ pull-down resistor RD2 to the configuration channel line 114 via the switch S1 in FIG. 1. For the DRP port mode at 318, the power circuit 122 refrains from delivering power to, or receiving power from, the power line 112 pending connection of the USB device to the USB port connector 102, and toggles between the unattached.SRC and Disabled states 201 and 203, where the bias circuit 146 connects the 200 KΩ pull-down resistor RD2 to the configuration channel line 114 via the switch S1 in the Disabled state 203.

The control circuit 130 determines at 320 whether port connection activity or I2C communications activity have been detected. If not (NO at 320), the process 300 continues in the second power mode at 312-318. If communications activity is detected at 310, the method 300 proceeds to 322 including returning to the first power mode and continuing the configured port mode operation. The control circuit 130 starts a timer at 322, and determines at 324 whether an I2C packet is received with a matching address before the timer expires. If not (NO at 324), the control circuit 130 returns the port controller 120 to the low power mode automatically at 328, and the process returns to 312-318 using the configured port mode as described above. Otherwise (YES at 324), the port controller 120 responds to the I2C message and continues normal power mode operation at 302-308 in FIG. 3A as previously described.

If a port attachment or connection is detected at 320 (YES at 320), the port controller 120 returns to the first power mode at 330 according to the same configured port mode, and the control circuit 130 alerts the port manager circuit 104, for example, by writing an appropriate flag bit in the alert register 137 in FIG. 1. When exiting the low power mode at 330, the port controller 120 remains in the last port mode (e.g., source/sink) that it was in when it detected a port connection. For example, if the port controller 120 was applying RP2 in the low-power mode, the port controller 120 connects RP1 in the normal mode and then disconnects RP2 so that there is a practically seamless transition. The port controller 120 similarly switches from connection of RD2 in the low power mode to connection of RD1 in transitioning to the normal power mode. The process 300 then returns to 302-308 in FIG. 3A for normal mode operation as described above.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A control circuit comprising:
a processor;
a port manager coupled to the processor;
a port connection;
a communications interface circuit coupled to the port manager;
a state machine configurable to:
operate the port connection in a port mode while the control circuit operates in a first power mode; and
transition from operating the control circuit in the first power mode to operating in a second power mode while continuing to operate the port connection in the port mode;
a first comparator configured to compare a voltage on a serial data line of the communications interface circuit to a first voltage threshold;
a second comparator configured to compare a voltage on a configuration channel line of the port connection to a second voltage threshold; and
a third comparator configured to compare the voltage on the configuration channel line to a third voltage threshold.

2. The control circuit of claim 1, wherein the first power mode is low power mode and the second power mode is normal mode.

3. The control circuit of claim 1, wherein the first power mode is normal mode and the second power mode is low power mode.

4. The control circuit of claim 1, wherein the port mode is a first port mode, and the state machine is configurable to transition from the first port mode to a second port mode.

5. The control circuit of claim 1, wherein the port mode is source port mode, sink port mode, or dual role power mode.

6. The control circuit of claim 1, wherein the state machine is further configurable to toggle between a first state and a second state while in the first power mode.

7. The control circuit of claim 1, wherein transitioning from the first power mode to the second power mode is performed in response to detecting a signal at the port connection.

8. The control circuit of claim 1, wherein transitioning from the first power mode to the second power mode is performed in response to receiving a signal at a port interface.

9. A circuit comprising:
a processor;
a port manager coupled to the processor;
a port connection;
a port controller coupled to the processor, to the port manager, and to the port connection, the port controller comprising: a communications interface coupled to the port manager; and
a control circuit coupled to the communications interface and the port connection, wherein the control circuit is configurable to:
operate the port connection in a port mode while operating in a first power mode; and
transition from the first power mode to operating in a second power mode while continuing to operate in the port mode;
a first comparator configured to compare a voltage on a serial data line of the communications interface to a first voltage threshold;
a second comparator configured to compare a voltage on a configuration channel line of the port connection to a second voltage threshold; and
a third comparator configured to compare the voltage on the configuration channel line to a third voltage threshold.

10. The circuit of claim 9, further comprising a power supply coupled to the processor and to the port controller, wherein the port controller further comprises a power circuit coupled to the power supply, to the control circuit, and to the port connection.

11. The circuit of claim 9, wherein the port controller further comprises a bias control circuit, the bias control circuit comprising:
a first switch having a first switch terminal and a second switch terminal, wherein the first switch terminal is coupled to a configuration channel line of the port connection;
a first resistor coupled between the second switch terminal and a ground terminal and having a first resistance;
a second switch having a third switch terminal and a fourth switch terminal, wherein the third switch terminal is coupled to the configuration channel line; and
a second resistor coupled between the third switch terminal and a voltage supply terminal and having a second resistance.

12. The circuit of claim 11, further comprising:
a third switch having a fifth switch terminal and a sixth switch terminal, wherein the fifth switch terminal is coupled to the configuration channel line;
a third resistor coupled between the sixth switch terminal and the ground terminal and having a third resistance, wherein the third resistance is less than the first resistance;
a fourth switch having a seventh switch terminal and an eighth switch terminal, wherein the seventh switch terminal is coupled to the configuration channel line; and
a fourth resistor coupled between the eighth switch terminal and the voltage supply terminal and having a fourth resistance, wherein the fourth resistance is equal to the second resistance.

13. The circuit of claim 9, wherein the port connection is coupled to a universal serial bus (USB) device.

14. A method comprising:
operating a port connection in a port mode while a control circuit operates in a first power mode;
transitioning the control circuit from a first power mode to a second power mode while continuing to operate the port connection in the port mode in response to a communications interface circuit receiving a first command from a port manager circuit over a communications connection; and
transitioning the control circuit from the second power mode to the first power mode responsive to each event from a set of events consisting of:
(1) the communications interface circuit receiving a second command from the port manager circuit over the communications connection;
(2) receiving no commands during a particular non-zero time after transitioning from the first power mode to the second power mode; and
(3) determining that a command received during the particular non-zero time was a false triggering event.

15. The method of claim 14, wherein the first power mode is low power mode and the second power mode is normal mode.

16. The method of claim 14, wherein the first power mode is normal mode and the second power mode is low power mode.

17. The method of claim 14, wherein the port mode is a first port mode, and the method further comprises transitioning from the first port mode to a second port mode.

18. The method of claim 14, wherein the port mode is source port mode, sink port mode, or dual role power mode.

19. The method of claim 14, wherein transitioning from the first power mode to the second power mode is performed in response to detecting a signal at the port connection.

* * * * *